(12) United States Patent
Chataignier et al.

(10) Patent No.: US 10,613,621 B2
(45) Date of Patent: Apr. 7, 2020

(54) INTERACTIVE DISPLAY SYSTEM AND METHOD FOR OPERATING SUCH A SYSTEM

(71) Applicant: ARK, La Ravoire (FR)

(72) Inventors: Lionel Chataignier, La Ravoire (FR); Geoffrey Chataignier, La Ravoire (FR); Léo Giorgis, La Ravoire (FR); Hugo Loi, La Ravoire (FR)

(73) Assignee: ARK, La Ravoire (FR)

( * ) Notice: Subject to any disclaimer, the term of this patent is extended or adjusted under 35 U.S.C. 154(b) by 0 days.

(21) Appl. No.: 15/947,327

(22) Filed: Apr. 6, 2018

(65) Prior Publication Data

US 2018/0292886 A1    Oct. 11, 2018

(30) Foreign Application Priority Data

Apr. 7, 2017   (FR) ...................... 17 53048

(51) Int. Cl.
| | |
|---|---|
| *G06F 3/00* | (2006.01) |
| *G09G 3/00* | (2006.01) |
| *G06F 3/042* | (2006.01) |
| *A63F 13/214* | (2014.01) |
| *A63F 13/53* | (2014.01) |

(Continued)

(52) U.S. Cl.
CPC ............ *G06F 3/005* (2013.01); *G06F 3/0421* (2013.01); *G09G 3/002* (2013.01); *G09G 3/003* (2013.01); *A63F 13/214* (2014.09); *A63F 13/30* (2014.09); *A63F 13/53* (2014.09); *A63F 13/56* (2014.09); *A63F 13/573* (2014.09); *A63F 2300/00* (2013.01); *A63F 2300/10* (2013.01); *A63F 2300/30* (2013.01)

(58) Field of Classification Search
None
See application file for complete search history.

(56) References Cited

U.S. PATENT DOCUMENTS

| | | |
|---|---|---|
| 2004/0125044 A1 | 7/2004 | Suzuki |
| 2010/0328306 A1 | 12/2010 | Chau et al. |

(Continued)

FOREIGN PATENT DOCUMENTS

| | | |
|---|---|---|
| EP | 1 396 781 A2 | 3/2004 |
| KR | 10-2010-0116970 A | 11/2010 |

OTHER PUBLICATIONS

French Search Report and Written Opinion dated Dec. 6, 2017 issued in counterpart application No. FR1753048; w/ English machine translation (14 pages).

*Primary Examiner* — Stephen T. Reed
(74) *Attorney, Agent, or Firm* — Seckel IP, PLLC

(57) ABSTRACT

The invention relates to an interactive display system (1) configured to produce an immersion of a user (3) in a virtual visual environment comprising several devices (2) for broadcasting at least one graphic representation that are capable or partially or entirely covering a visual field of the user (3), each broadcasting device (2) being provided with an element (4) for displaying said at least one graphic representation and an interactive interface (5) comprising a zone (6) for receiving at least one impact which is defined over all or part of an outer face (7*a*) of the display element (4), said interactive interface (5) comprising a device (8) for emitting infrared radiation and a device (9) for capturing at least one image of an outer face (7*a*) of said display element (4).

23 Claims, 2 Drawing Sheets

(51) Int. Cl.
*A63F 13/56* (2014.01)
*A63F 13/573* (2014.01)
*A63F 13/30* (2014.01)
*A63F 13/80* (2014.01)

(56) References Cited

U.S. PATENT DOCUMENTS

| | | | |
|---|---|---|---|
| 2012/0156652 A1* | 6/2012 | Lane | F41J 9/14 434/11 |
| 2013/0181901 A1* | 7/2013 | West | G09G 5/14 345/161 |
| 2014/0048681 A1 | 2/2014 | Kao et al. | |
| 2014/0192087 A1* | 7/2014 | Frost | G06F 3/011 345/633 |

* cited by examiner

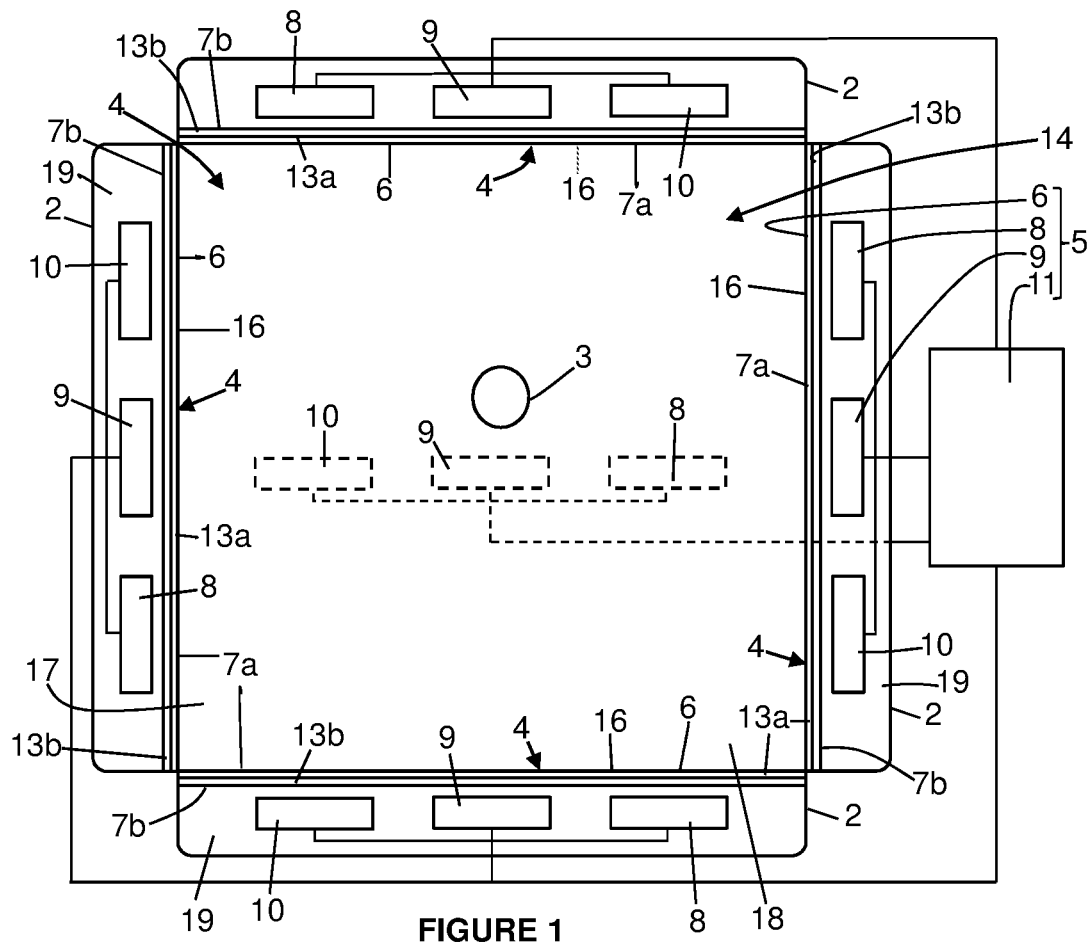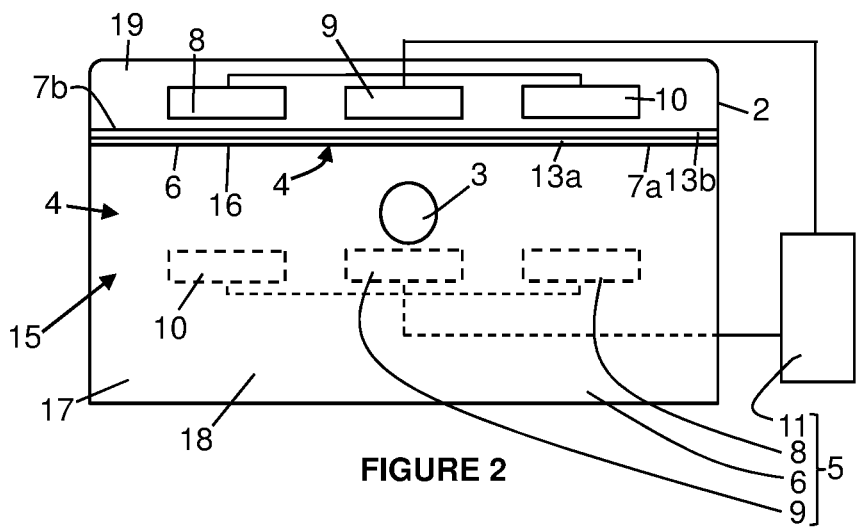

INTERACTIVE DISPLAY SYSTEM AND METHOD FOR OPERATING SUCH A SYSTEM

This application claims priority of French application No. FR1753048 filed Apr. 7, 2017, which is hereby incorporated by reference in its entirety.

The invention relates to an interactive display system and a method for operating such a system.

Traditionally, interactive display systems generally comprise a device for broadcasting an image or even a video provided with a display element such as a touch screen.

Such a touch screen makes it possible to combine the display functionalities with those of a pointing device such as a mouse or even a pad. In effect, a user of this system can, by touching this screen with his or her finger, perform the same operations as with the traditional pointing device.

In the state of the art, the touch screen works more often than not according to a so-called "capacitive" technology. In such a capacitive touch screen, when the finger of the user is in contact with an outer face of this screen, electrical charges are transferred to him or her. This transfer of electrical charges generates a loss of charge which is then detected by measurement systems placed at the four corners of the screen in order to identify the position of the point of contact between the finger and this outer face of the screen and thus perform the operation envisaged by the user.

However, one of the drawbacks of such display systems is linked to the fact that the capacitive touch screens that they include can interact only with the fingers of a user which drastically limits the areas of use of these display systems. Furthermore, the capacitive touch screens of these display systems have high manufacturing costs, which costs increase with the size of these screens.

The present invention aims to mitigate such drawbacks associated with the prior art.

To this end, the invention relates to an interactive display system configured to produce an immersion of a user in a virtual visual environment comprising several devices for broadcasting at least one graphic representation that are capable of partially or entirely covering a visual field of the user, each broadcasting device being provided with an element for displaying said at least one graphic representation and an interactive interface comprising a zone for receiving at least one impact which is defined over all or part of an outer face of the display element, said interactive interface comprising a device for emitting infrared radiation and a device for capturing at least one image of an outer face of said display element.

In other embodiments:
- each broadcasting device comprises a device for projecting at least one graphic representation that is capable of emitting light radiation toward the display element;
- the system comprises a processing unit connected via a link element to the emission, capture and projection devices of each broadcasting device of the system;
- in each broadcasting device:
  - the emission device comprises several infrared light sources arranged in such a device so as to generate a homogeneous and/or uniform light distribution on the display element, and/or
  - the capture device comprises at least one camera and/or a photographic sensor in particular comprising an infrared filter, and/or
  - the projection device comprises at least one video projector;
  - the emission device comprises light sources such as high-intensity light-emitting diodes emitting radiation in the infrared wavelengths;
- the system comprises the following features:
  - the display element of each broadcasting device is translucent or transparent, and/or
  - the display element of each broadcasting device comprises two layers of material, a first transparent layer that can be passed through by infrared radiation and a second layer that can refract light radiation, and/or
  - the display element of each broadcasting device comprises a first layer comprising an outer face of said display element and a second layer comprising the inner face of this display element, and/or
  - the display element of each broadcasting device comprises a second layer forming a zone for displaying said at least one graphic representation, in particular a back-projection screen.
- the first layer exhibits characteristics of high resistance to shocks and/or to scratches/abrasions;
- the broadcasting devices define a closed space in which the user can move around;
- the system is of "cave" type, and
- the broadcasting devices define an open space in which the user can move around.

The invention relates also to a method for operating such an interactive display system configured to produce an immersion of a user in a virtual visual environment, comprising the following steps:
- starting up the system comprising a substep of broadcasting at least one graphic representation by the broadcasting devices of the system, and
- identification of an activation of an interactive interface of at least one of the broadcasting devices of the system, the identification step comprising a substep of detection of an impact in a reception zone defined over all or part of an outer face of a display element of said broadcasting device.

Advantageously, the detection substep comprises:
- a phase of acquisition of images of an inner face of the display element of each broadcasting device, and
- a phase of comparison of each of these acquired images with at least one reference image of this inner face captured during the step of starting up the system.

The invention relates also to a computer program comprising program code instructions for executing the steps of this method when said program is run by a processing unit of this interactive display system.

Other advantages and features of the invention will become more clearly apparent on reading the following description of a preferred embodiment, with reference to the figures, given by way of indicative and nonlimiting example:

FIG. 1 is a plan schematic view of an interactive display system comprising broadcasting devices forming a closed space according to an embodiment of the invention;

FIG. 2 is a plan schematic view of the interactive display system comprising broadcasting devices forming an open space according to the embodiment of the invention;

Figure 3:
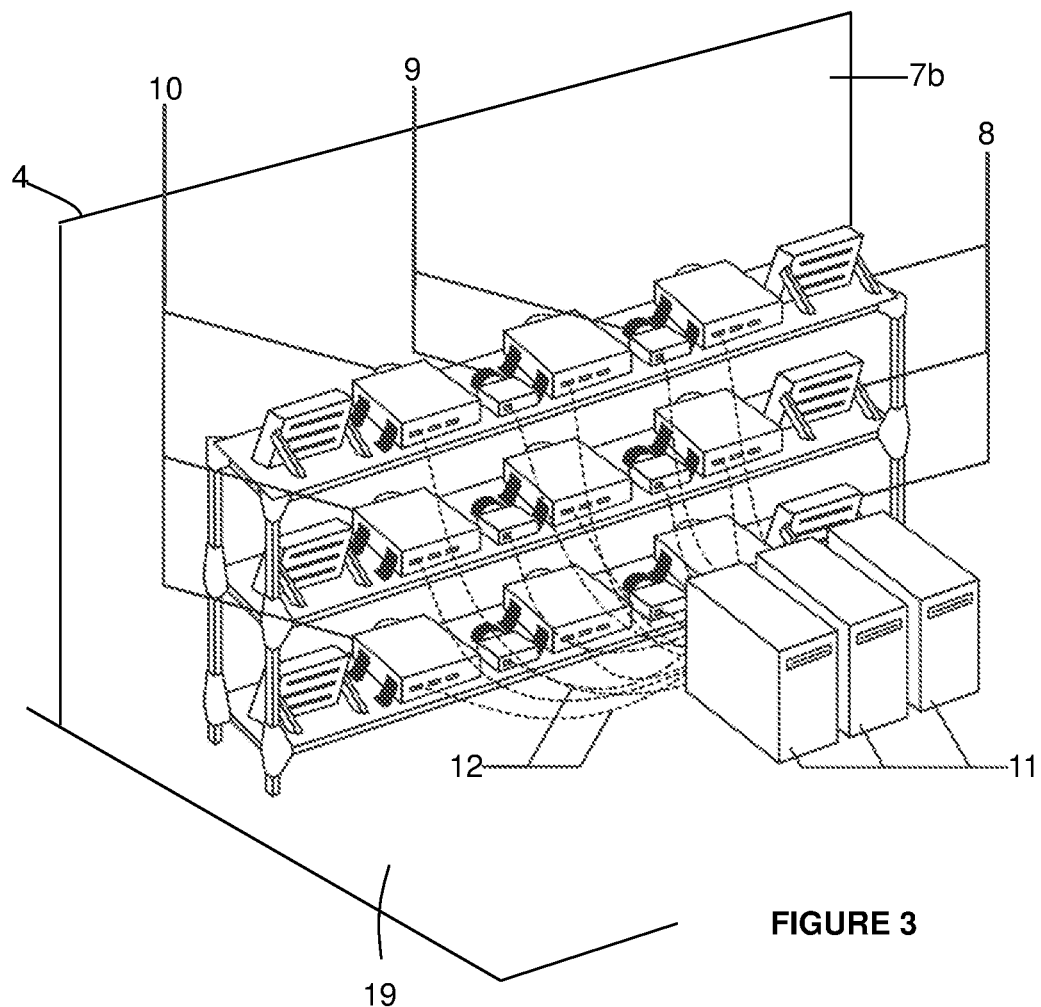
FIG. 3 represents a schematic view of an internal region of the broadcasting device, according to the embodiment of the invention, and FIG. 4 schematically represents a method for operating the interactive display system according to the embodiment of the invention.

In this embodiment of the invention illustrated in FIGS. 1 to 3, the interactive display system 1 is configured to produce an immersion of a user 3 in a virtual visual environment comprising a processing unit 11 and several devices 2 for broadcasting at least one graphic representation such as an image or even several images then forming a video. Such a system 1 can be implemented in the field of cinema, video gaming, sports training or even education. It will be noted that this system 1 makes it possible to produce an immersion of its user 3 in a virtual visual environment which is non-intrusive.

In this system 1 and with reference to FIG. 1, these broadcasting devices 2 can be arranged so as to define a closed space 14. In such a configuration, the system 1 can then be a system of "CAVE" type, an acronym for "Cave Automatic Virtual Environment". In this system 1, the user 3 is then situated in this closed space 14 in which space 14 he or she can move around and/or perform movements. In this context, these broadcasting devices 2 can then form together, for example, a cube defining this closed space 14. In this context, this cube can then correspond to a room whose walls are formed by such broadcasting devices 2. In other words, this closed space 14 comprises walls 16, here four walls, and a ceiling (not represented) and a floor 17 which each comprise one of these broadcasting devices 2. In such a configuration, these broadcasting devices 2 entirely cover the visual field of the user 3 and do so regardless of his or her motions and/or his or her movements within this closed space 14, so this configuration contributes to producing a total immersion of the user 3 in a virtual visual environment.

Alternatively and with reference to FIG. 2, these broadcasting devices 2 can be arranged so as to define an open space 15. This open space 15 can be situated outside or in a room. In this context, there can be two of these broadcasting devices 2 respectively forming a floor 17 on which the user 3 can move around and/or perform motions, and a wall 16 arranged in front of this user 3 and facing which he or she can then also move around and perform motions. In another example, this open space 15 can correspond to a portion of a cube then defining a room of which only a few walls are formed by these broadcasting devices 2. For example, only three of the four walls, the ceiling and the floor of this room each comprise one of these broadcasting devices 2. In such a configuration, these broadcasting devices 2 partially cover the visual field of the user 3 when he or she moves around and/or performs motions in this open space 15, so this configuration contributes to producing a partial immersion of the user 3 in a virtual visual environment.

In this system 1, the processing unit 11 such as a computer comprises hardware and/or software elements. These hardware and/or software elements more specifically comprise at least one microprocessor cooperating with memory elements. This processing unit 11 is capable of executing program code instructions for implementing a computer program. This program code can in particular comprise an algorithm for digitally processing images. The memory elements of the processing unit 11 comprise in particular data relating to at least one graphic representation of image or even video type which can be transmitted to the broadcasting devices 2. This processing unit 11 is connected to the broadcasting devices 2 of the system 1 via a link element 12.

These broadcasting devices 2, otherwise called "interactive display surfaces" or even "interactive screens" operate according to a technology different from the capacitive and resistive technologies of the prior art. More specifically, each broadcasting device 2 that can be seen in FIGS. 1 and 2 comprises an element 4 for displaying said at least one graphic representation, an interactive interface 5 and a device 10 for projecting said at least one graphic representation.

In each broadcasting device 2, the display element 4 is preferably planar but it can however, in another variant, be curved to have a hemispherical or cylindrical form. This display element 4 delimits an inner region 19 of the broadcasting device 2 from an outer region 18 thereof also called "user side" where this user 3 of the system 1 is preferably situated.

In the inner region 19 of this broadcasting device 2, there are arranged components of the interactive interface 5 which are described hereinbelow and the projection device 10. It will also be noted that this display element 4 comprises inner and outer faces 7a, 7b with the inner face 7b which is arranged facing the inner region 19 of the broadcasting device 2 and the outer face 7a facing the outer region 18 thereof.

Such a display element 4 can be translucent or transparent. It is preferably composed of two layers 13a, 13b of material: a first layer and a second layer 13a, 13b.

The first layer 13a comprises the outer face 7a of the display element 4. This first layer 13a is a transparent layer which is produced in a transparent material defined in particular to be passed through by infrared radiation of a wavelength substantially greater than 850 nm. This first transparent layer 13a is for example produced in a thermoplastic material such as, for example, PMMA (polymethyl methacrylate) better known by the trademark Plexiglas™. It can have a thickness which is preferably at least 1500 µm or even at least 3000 µm.

It will be noted that this first layer 13a exhibits characteristics of high resistance to shocks and/or to scratches/abrasions. These resistance characteristics can be configured in particular by varying the thickness of this first layer 13a. Furthermore, this first layer 13a allows the display element 4 to have an outer face 7a which can be washed and is unbreakable. As an example, such a first layer 13a can have a thickness of between 15 and 25 mm, preferably 20 mm and have a wear resistance at a pressure of between 600 and 1000 N/m$^2$, and preferably 900 N/m$^2$.

The second layer 13b comprises the inner face 7b of the display element 4. This second layer 13b is a layer of material defined to refract light radiation, in particular near light radiation originating from the projection device 10 according to a defined angle that can lie between 0 and 70 degrees. It will be noted that the angle of 0 degrees corresponds to incident light radiation perpendicular to the inner face 7b of the display element 4.

Such a second layer 13b forms a zone for displaying said at least one graphic representation by being in particular a back-projection screen or a broadcaster of such a graphic representation.

This second layer 13b has a thickness which lies between 50 and 250 µm, and which is preferably 150 µm.

The first and second layers 13a, 13b are linked to one another preferably by bonding-type link elements.

In this system 1, the interactive interface 5 of each display device comprises the following components: a device 8 for emitting infrared radiation and a device 9 for capturing at least one image of an outer face 7a of said display element 4 and a zone 6 for receiving at least one impact defined over all or part of the outer face 7a of the display element 4.

It will be noted that this interactive interface 5 also comprises the processing unit 11 of the system 1 to which the emission and capture devices of this interactive interface 5 are connected via a link element 12.

In this interface 5, the reception zone 6 is designed to receive at least one impact making it possible to perform an interaction between the user 3 and the system 1. This impact can result from a brushing or a contact or even a collision between an object and the outer face 7a of the display element 4. This object can be liquid, solid or non-solid and/or with or without magnetic properties. This object can, in a nonlimiting and nonexhaustive manner, be an element carried/worn by this user 3, a bouncing body that can have elastic properties, a liquid such as water, a non-solid object such as snow or even sand. It will be noted that this impact can also be produced by a part of a body of the user 3.

Thus, it will be understood that such an interactive interface 5 makes it possible to detect a wider spectrum of impacts.

The emission device 8 of this interactive interface 5 comprises several infrared light sources arranged in this device 8 so as to generate a homogeneous and/or uniform light distribution on the display element 4, in particular on the inner face 7b of this element 4. These light sources are configured in this emission device 8 and chosen to ensure lighting that is uniform/homogeneous and/or constant spatially and in time. These light sources are supplied constantly with electrical energy and are configured to emit a constant energy. Advantageously, the emission device is positioned on the same side as the user 3, inside the closed space 14. It will be observed that the capture device 9 can operate with a greater accuracy when the emission device is positioned on the same side as the user 3, inside the closed space 14.

It will be noted by way of example that the emission device 8 can comprise, in a nonlimiting and nonexhaustive manner, between 4 and 200 infrared light sources. It will be understood here that the number of light sources depends on their power as well as on their projection angle. In the least costly optimal configuration, the emission device 8 can comprise four powerful light sources arranged respectively at each corner of the display element 4. In this configuration, the excessive lighting can be compensated by the application of a shield over each of these light sources.

In this embodiment, these light sources are high-intensity light-emitting diodes emitting radiation in the wavelengths of the infrared. These wavelengths are chosen to be different or even far from the visible spectrum in order for the light radiation from the projection device 10 not to interfere with the radiation from this emission device 8. These wavelengths are preferably greater than 850 nm.

The capture device 9 of this interactive interface 5 comprises at least one camera and/or a photographic sensor. This camera or this photographic sensor comprises a photosensitive electronic component that is used to convert visible, ultraviolet or even infrared light radiation into an analog electrical signal which is then amplified then digitized by an analog-digital converter and finally processed to obtain at least one digital image stored in the memory elements of the processing unit 11. It will be noted that the camera and the photographic sensor can each be associated with a physical or even software infrared filter. When this filter is software, it is then implemented by the digital image processing algorithm executed by the processing unit 11.

The capture device 9 from each camera and/or photographic sensor is capable of capturing at least one image of an outer face 7a of said display element 4. In other words, this device 9 is capable of capturing the light originating from the outer region 18 of the broadcasting device 2 in which the user 3 of the system 1 is situated. It will be noted that the capture device 9 can acquire images by operating at high frequencies, preferably greater than 100 Hz.

In each broadcasting device 2, the projection device 10 comprises at least one video projector. This projection device 10 is capable of emitting light radiation that makes it possible to project at least one graphic representation such as an image or several images forming a video onto the second layer 13b of the display element 4. The use of a video projector makes it possible to project images of large size, which is particularly important for creating an immersion of the user in the virtual environment. Contrary to the use of several juxtaposed screens (such as LCD screens for example), the projected image is not interrupted by a frame or a separator surrounding the juxtaposed screens. The image can also be projected into the corners between two walls. The image can therefore be continuous between two walls forming a corner. The image obtained is therefore of a single piece which improves the immersive experience of the user.

Figure 4:
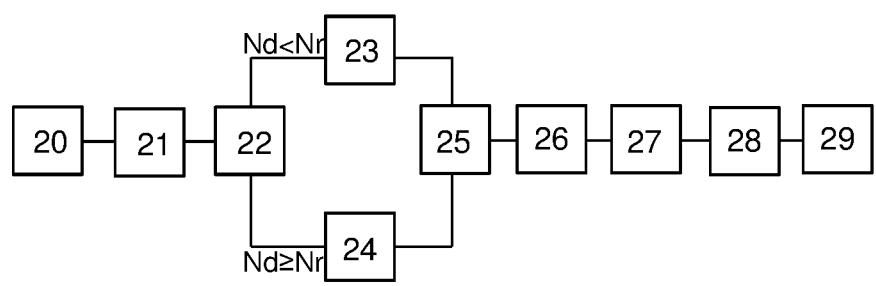

Referring to FIG. 4, the invention relates also to a method for operating the system 1. This method is capable of implementing such an interactive display system 1.

This method comprises a step of starting up 20 the system 1 during which the broadcasting devices 2 are electrically powered and in particular the device 8 for emitting infrared radiation, the capture device 9 and the projection device 10. During this step 20, the user 3 of the system 1 takes his or her place in the open 15 or closed 14 space defined by the mutual arrangement of the broadcasting devices 2.

This start-up step 20 comprises a substep of broadcasting 21 at least one graphic representation by the broadcasting devices 2 of the system 1. More specifically, during this substep 21, the processing unit 11 selects data archived in its memory elements relating to at least one graphic representation such as an image or several images forming a video. These data are then transmitted by the processing unit 11 to the broadcasting devices 2 and in particular to the projection device 10 of each of these broadcasting devices 2. On receipt of these data, the projection devices 10 emit light radiation then projecting said at least one graphic representation onto the display elements 4, in particular onto the second layer 13b of each of these elements 4.

The start-up step 20 also comprises a substep of activation of a generation 22 of infrared radiation by the emission device 8 of each broadcasting device 2 of the system 1 as a function of a determination of a level Nd of infrared light in the outer region 18 of each broadcasting device 2. During this substep 22, the processing unit 11 determines, from one or more capture devices 9 of the broadcasting devices 2, the level Nd of infrared light present in the outer region 18 of these broadcasting devices 2. This level Nd of infrared light that is thus determined is then compared to a reference level Nr of infrared light.

In a first case, if the determined level Nd of infrared light is less than the reference level Nr of infrared light then the processing unit 11 triggers, in an emission phase 23, the generation by the emission devices 8 of the broadcasting devices 2 of infrared radiation. In this first case, the level of infrared light in the outer region 18 of the broadcasting devices 2 is then considered to be low. Such a first case is generally identified when the broadcasting devices 2 define a closed space 14.

Conversely, in a second case, if the determined level Nd of infrared light is greater than or equal to the reference level Nr of infrared light then the processing unit 11 does not trigger, in a non-emission phase 24, the generation of infrared radiation by the emission devices. In this second case, the level of infrared light in the outer region 18 of the broadcasting devices 2 is then considered to be high. Such a second case is generally identified when the broadcasting devices 2 define an open space 15.

During the performance of this substep 22, when the infrared radiation is emitted, it is then capable of passing through the display elements of the broadcasting devices 2 and in particular the first and second layers 13a, 13b of each display element 4 toward the outer region 18 of the broadcasting devices 2.

It will be noted that the substeps of broadcasting and of activation of a generation 21, 22 of infrared radiation are preferably implemented substantially simultaneously.

The method then comprises a step of configuration 25 of the interactive interface 5. During this step 25, the processing unit 11 performs, by being linked to the capture device 9 of each broadcasting device 2, an acquisition of at least one image of the inner face 7b of the display element 4 of each of these broadcasting devices 2. As will be understood here, it can alternatively acquire several images forming a video. Such an acquisition of at least one image makes it possible to assess the level of infrared light present on the inner face 7b of the display element 4 of each broadcasting device 2 during the starting up of the system 1.

This said at least one image is then archived in the memory elements of the processing unit 11 and then forms a reference image.

The method then comprises a step of identification of an activation 26 of the interactive interface 5. Such an activation takes place as soon as an object collides with the outer face 7a of the display element 4 of one of the broadcasting devices 2 of the system 1. This activation step comprises a substep of detection 27 of an impact in the reception zone 6 defined over all or part of the outer face 7a of the display element 4 of one of the broadcasting devices 2 of the system 1.

This detection substep 27 comprises a phase of acquisition 28 of images of the inner face 7b of the display element 4 of each broadcasting device 2. This image acquisition phase 28 can be performed continuously. During this phase 28, these acquired images are each transmitted to the processing unit 11 as they are captured. The detection substep 27 then provides a phase of comparison 29 of each of these acquired images with said at least one reference image from the execution by the processing unit 11 of the digital image processing algorithm. During this comparison phase 29, as soon as at least one difference is identified between one of these acquired images and said at least one reference image, then an impact is detected. In this context, each difference corresponds to a variation of the level of infrared light between the acquired image of the inner face 7b of the display element and said at least one reference image.

The main cause of this variation of level of infrared light is explained hereinbelow for the first and second cases described previously in the activation substep 22. With regard to the first case in which the level of infrared light in the outer region 18 of the broadcasting devices 2 is considered to be low, when an object enters into collision with the outer face 7a of the display element 4, the latter will then reflect the infrared radiation emitted by the emission device 8, which corresponds to an increase in the level of infrared light in the image acquired upon the impact compared to the level of infrared light present in said reference image. Regarding the second case in which the level of infrared light in the outer region 18 of the broadcasting devices 2 is considered to be high, when an object enters into collision with the outer face 7a of the display element 4, the latter will then block the infrared light from this outer region 18 then causing a lowering of the level of infrared light in the image acquired upon the impact compared to the level of infrared light present in said reference image.

During this detection substep 27, the processing unit 11 is then capable of locating, in the reception zone 6 defined over all or part of the outer face 7a of the display element 4, the position of this impact as a function of the identification of the position of the variation of infrared light resulting from the comparison between the acquired image relating to the impact and said at least one reference image.

The invention relates also to a computer program comprising program code instructions for executing the steps of this method, when said program is run by the processing unit 11 of the interactive display system 1.

Thus, the invention makes it possible to have an interactive display system 1 comprising several broadcasting devices 2 which are each capable of interacting with objects of any type or also with any part of the body of the user 3 of such a system 1. In addition, this interactive display system 1 allows for the production of interactive virtual environments at lower costs. In effect, the cost of production of this system 1 decreases when the surface of the display element 4 increases.

The invention claimed is:

1. An interactive display system configured to produce an immersion of a user in a virtual visual environment,
   the interactive display system comprising a plurality of devices for broadcasting at least one graphic representation that are capable of partially or entirely covering a visual field of the user,
   each broadcasting device being provided with an element for displaying said at least one graphic representation and an interactive interface comprising a reception zone for receiving at least one physical impact which is defined over all or part of an outer face of the display element,
   the interactive interface comprising a device for emitting infrared radiation on the display element and a device for capturing at least one image of an outer face of the display element including an infrared radiation present on the outer face of the display element, wherein the interactive interface is capable of detecting the physical impact in the reception zone of the interactive interface defined over all or part of the outer face of the display element by comparing a level of the infrared radiation present on the outer face of the display element to a reference level.

2. The system as claimed in claim 1, wherein each broadcasting device comprises a device for projecting at least one graphic representation that is capable of emitting light radiation toward the display element.

3. The system as claimed in claim 2, comprising a processing unit connected via a link element to the emission, capture and projection devices of each broadcasting device of the system.

4. The system as claimed in claim 1, comprising a processing unit connected via a link element to the emission and capture devices of each broadcasting device of the system.

5. The system as claimed in claim 1, wherein, in each broadcasting device, at least one of the following is provided:
   the emission device comprises several infrared light sources arranged in the emission device so as to generate a homogeneous and/or uniform light distribution on the display element;

the capture device comprises at least one camera and/or a photographic sensor comprising an infrared filter.

6. The system as claimed in claim 1, wherein the emission device comprises light sources emitting radiation in the infrared wavelengths.

7. The system as claimed in claim 6, wherein the light sources of the emission device are high-intensity light-emitting diodes.

8. The system as claimed in claim 1, wherein at least one of the following is provided:
the display element of each broadcasting device is translucent or transparent,
the display element of each broadcasting device comprises two layers of material, the two layers of material including a first transparent layer that can be passed through by infrared radiation and a second layer that can refract light radiation,
the display element of each broadcasting device comprises a first layer comprising an outer face of the display element and a second layer comprising the inner face of this display element,
the display element of each broadcasting device comprises a second layer forming a zone for displaying the at least one graphic representation.

9. The system as claimed in claim 8, wherein the first layer exhibits characteristics of high resistance to shocks and/or to scratches/abrasions.

10. The system as claimed in claim 8, wherein the display element of each broadcasting device comprises a second layer forming a zone for displaying the at least one graphic representation.

11. The system as claimed in claim 10, wherein the display element is a back-projection screen.

12. The system as claimed in claim 1, wherein the broadcasting devices define a closed space in which the user can move around.

13. The system as claimed in claim 12, wherein the system is has a Cave Automatic Virtual Environment configuration.

14. The system as claimed in claim 1, wherein the broadcasting devices define an open space in which the user can move around.

15. The system as claimed in claim 1, wherein the interactive interface is capable of locating the position of the impact in the reception zone.

16. A method for operating the interactive display system as claimed in claim 1, the method comprising:
starting up the system comprising broadcasting at least one graphic representation by the broadcasting devices of the system, and
identifying an activation of the interactive interface of at least one of the broadcasting devices of the system,
wherein the identifying comprises detecting an impact in the reception zone defined over all or part of the outer face of the display element of the broadcasting device.

17. The method as claimed in claim 16, wherein the detecting comprises:
a phase of acquiring images of an inner face of the display element of each broadcasting device, and
a phase of comparing each of the acquired images with at least one reference image of the inner face captured during the starting up of the system.

18. The method as claimed in claim 16, wherein, in each broadcasting device, at least one of the following is provided:
the emission device comprises several infrared light sources arranged in the emission device so as to generate a homogeneous and/or uniform light distribution on the display element;
the capture device comprises at least one camera and/or a photographic sensor comprising an infrared filter.

19. The method as claimed in claim 16, comprising locating the position of the impact in the reception zone.

20. A computer program comprising program code instructions configured so that, when the program is run by a processing unit of an interactive display system configured to produce an immersion of a user in a virtual visual environment,
wherein the interactive display system comprises a plurality of devices for broadcasting at least one graphic representation that are capable of partially or entirely covering a visual field of the user,
each broadcasting device being provided with an element for displaying said at least one graphic representation and an interactive interface comprising a reception zone for receiving at least one physical impact which is defined over all or part of an outer face of the display element,
the interactive interface comprising a device for emitting infrared radiation on the display element and a device for capturing at least one image of an outer face of the display element including an infrared radiation present on the outer face of the display element,
the program executes the following:
starting up the system comprising broadcasting the at least one graphic representation by the plurality of broadcasting devices of the system, and
identifying an activation of the interactive interface of at least one of the plurality of broadcasting devices of the system,
wherein the identifying comprises detecting the physical impact in the reception zone of the interactive interface defined over all or part of an outer face of a display element of the broadcasting device by comparing a level of the infrared radiation present on the outer face of the display element to a reference level.

21. The computer program as claimed in claim 20, wherein the detecting is executed by:
a phase of acquiring images of an inner face of the display element of each broadcasting device, and
a phase of comparing each of the acquired images with at least one reference image of the inner face captured during the starting up of the system.

22. The computer program as claimed in claim 20, wherein, in each broadcasting device, at least one of the following is provided:
the emission device comprises several infrared light sources arranged in the emission device so as to generate a homogeneous and/or uniform light distribution on the display element;
the capture device comprises at least one camera and/or a photographic sensor comprising an infrared filter.

23. The computer program as claimed in claim 20, wherein the identifying comprises locating the position of the impact in the reception zone.

* * * * *